US012134046B1

(12) United States Patent
Dolson

(10) Patent No.: US 12,134,046 B1
(45) Date of Patent: Nov. 5, 2024

(54) EFFICIENT WATER PURIFICATION SYSTEM AND METHOD

(71) Applicant: Erik Dolson, Sisters, OR (US)

(72) Inventor: Erik Dolson, Sisters, OR (US)

(*) Notice: Subject to any disclaimer, the term of this patent is extended or adjusted under 35 U.S.C. 154(b) by 549 days.

(21) Appl. No.: 17/369,335

(22) Filed: Jul. 7, 2021

Related U.S. Application Data

(60) Provisional application No. 63/060,865, filed on Aug. 4, 2020.

(51) Int. Cl.
| | |
|---|---|
| *B01D 1/00* | (2006.01) |
| *B01D 5/00* | (2006.01) |
| *C02F 1/04* | (2023.01) |
| *C02F 1/14* | (2023.01) |
| *C02F 103/08* | (2006.01) |

(52) U.S. Cl.
CPC ......... *B01D 1/0047* (2013.01); *B01D 1/0017* (2013.01); *B01D 1/0035* (2013.01); *B01D 1/0094* (2013.01); *B01D 5/0003* (2013.01); *B01D 5/0039* (2013.01); *B01D 5/006* (2013.01); *B01D 5/0075* (2013.01); *B01D 5/0087* (2013.01); *C02F 1/043* (2013.01); *C02F 1/14* (2013.01); *C02F 2103/08* (2013.01); *C02F 2303/10* (2013.01)

(58) Field of Classification Search
CPC .. B01D 1/0047; B01D 1/0017; B01D 1/0035; B01D 1/0094; B01D 5/0003; B01D 5/0039; B01D 5/006; B01D 5/0075; B01D 5/0087; C02F 1/043; C02F 1/14; C02F 2103/08; C02F 2303/10
See application file for complete search history.

(56) References Cited

U.S. PATENT DOCUMENTS

| | | | | | |
|---|---|---|---|---|---|
| 3,441,482 | A | * | 4/1969 | Avery | F03G 3/00 202/175 |
| 3,649,467 | A | * | 3/1972 | Winsel et al. | H01M 8/0693 429/444 |
| 5,259,203 | A | * | 11/1993 | Engel | F24F 3/1405 62/291 |

(Continued)

*Primary Examiner* — Gordon A Jones
(74) *Attorney, Agent, or Firm* — Dean A. Craine

(57) ABSTRACT

A water purification system that produces freshwater from saltwater/contaminated water via two closed but connected and offset heating-evaporation-condensation-cooling processes that share energy via two heat exchangers. The system includes a closed air subsystem and a closed refrigerant subsystem. The closed air subsystem uses air repeatedly heated via a heat exchanger and a supplemental heating source. In the air/refrigerant heat exchanger, hot compressed gas refrigerant from the closed refrigerant system releases heat and undergoes a phase change to a liquid refrigerant. The supplemental heating source adds heat energy to produce hot, dry air delivered to a water evaporator containing saltwater/contaminated water. The hot, dry air causes evaporation of the saltwater/contaminated water forming hot air/water vapor. The hot air/water vapor is then delivered to an expander/condenser heat exchanger, where it is condensed into freshwater by the phase change of the liquid refrigerant back into a gas refrigerant. The two subsystems operate continuously and repeatedly exchange energies to efficiently produce freshwater.

16 Claims, 5 Drawing Sheets

(56) References Cited

U.S. PATENT DOCUMENTS

| | | | | |
|---|---|---|---|---|
| 5,450,728 A * | 9/1995 | Vora | F25J 3/08 | 62/912 |
| 5,671,605 A * | 9/1997 | Helterbrand | F25B 45/00 | 62/85 |
| 6,343,479 B1 * | 2/2002 | Merritt | F24F 5/0096 | 62/274 |
| 6,383,341 B1 * | 5/2002 | Lysen | B01D 61/364 | 202/205 |
| 6,405,551 B1 * | 6/2002 | Kuwabara | F25B 13/00 | 62/319 |
| 6,715,312 B1 * | 4/2004 | Teakell | F28F 19/00 | 62/305 |
| 6,716,355 B1 * | 4/2004 | Hanemaaijer | B01D 61/364 | 203/25 |
| 11,104,588 B1 * | 8/2021 | Ahmed | B01D 5/0039 | |
| 11,369,897 B2 * | 6/2022 | Bahar | B01D 63/06 | |
| 11,466,870 B1 * | 10/2022 | Shahsavar | C02F 1/441 | |
| 11,618,692 B2 * | 4/2023 | Al-Sulaiman | B01D 5/0003 | 202/167 |
| 11,679,339 B2 * | 6/2023 | Van de Mortel | B01D 5/0006 | 62/285 |
| 11,761,644 B1 * | 9/2023 | Qasem | F24F 3/1411 | 62/92 |
| 2004/0040322 A1 * | 3/2004 | Engel | E03B 3/28 | 62/177 |
| 2006/0112711 A1 * | 6/2006 | Yoon | B01D 5/0072 | 62/317 |
| 2012/0159972 A1 * | 6/2012 | Haryanto | F24F 13/1406 | 62/132 |
| 2013/0075245 A1 * | 3/2013 | Frick | B01D 1/0058 | 202/185.1 |
| 2013/0186740 A1 * | 7/2013 | Midttun | B01D 1/2856 | 202/180 |
| 2014/0061958 A1 * | 3/2014 | Sparrow | B01D 1/0011 | 261/153 |
| 2014/0360859 A1 * | 12/2014 | Faidi | B01D 1/0035 | 203/10 |
| 2015/0360971 A1 * | 12/2015 | Schleiffarth | B01D 1/28 | 202/176 |
| 2016/0251235 A1 * | 9/2016 | Shahsavar | B01D 5/006 | 203/25 |
| 2016/0264431 A1 * | 9/2016 | Enders | B01D 1/0035 |  |
| 2017/0057834 A1 * | 3/2017 | Popov | B01D 3/105 |  |
| 2019/0352194 A1 * | 11/2019 | Thiers | B08B 3/08 |  |
| 2020/0009471 A1 * | 1/2020 | Meghanathan | B01D 17/02 |  |
| 2020/0018050 A1 * | 1/2020 | Guo | E03B 3/28 |  |
| 2020/0025421 A1 * | 1/2020 | Isakov | F25B 23/006 |  |
| 2022/0106212 A1 * | 4/2022 | Montes Cuen | B03C 11/00 |  |

* cited by examiner

EFFICIENT WATER PURIFICATION SYSTEM AND METHOD

This utility patent application is based on and claims the filing date benefit of U.S. provisional patent application (Application No. 63/060,865) filed on Aug. 4, 2020.

COPYRIGHT NOTICE

Notice is given that the following patent document contains original material subject to copyright protection. Accordingly, the copyright owner has no objection to the facsimile or digital download reproduction of all or part of the patent document but otherwise reserves all copyrights.

BACKGROUND OF THE INVENTION

1. Field of the Invention

This invention relates to water purification systems, particularly water purification systems and methods that are more efficient than existing water purification systems.

2. Description of the Related Art

Water purification is the process of removing chemicals, contaminants, suspended solids, and gases from water. Distillation commonly used in water purification includes heating a body of contaminated water to form steam and cooling the steam, causing it to condense and form purified water. Unfortunately, the step of heating the contaminated water until it boils requires substantial amounts of energy that may not be available. Also, condensing the steam requires the absorption of energy into the surroundings or the operation of a condenser that also may not be available.

What is needed is a water purification system used to purify saltwater or contaminated water efficiently and in environments where electrical grid service is limited or non-existing.

SUMMARY OF THE INVENTION

An efficient water purification system and method are disclosed that produce freshwater from saltwater or contaminated water via two closed, heating-evaporation-condensation-cooling subsystems called 'loops'. The two subsystems exchange energy via two heat exchangers.

More particularly, the system uses a closed air loop that transports a fixed volume of air between different components. In the closed air loop, relatively low humidity air, called dry air, is created. The dry air is heated by a first heat exchanger (hereinafter called an air/refrigerant heat exchanger) and a supplemental heating source and eventually delivered to a water evaporator containing saltwater or contaminated water. Because the relative humidity of the dry air is low, a maximum amount of water evaporates. The warm moist air produced by the water evaporator is then delivered to a second heat exchanger (hereinafter called an expander/condenser heat exchanger). Inside the expander/condenser heat exchanger, the warm moist air condenses. Purified water is removed from the expander/condenser heat exchanger and the air, which after condensation is relatively dry, returns to the air/refrigerant heat exchanger via the closed air loop.

The second subsystem, called a closed refrigerant loop, includes a compressor, the air/refrigerant heat exchanger, and the expander/condenser heat exchanger. During operation, the compressor pressurizes the cool gas refrigerant into pressurized hot gas refrigerant. Heat from the pressurized hot gas refrigerant is absorbed by cool dry air flowing through the air/refrigerant heat exchanger via the closed air loop. The pressurized hot gas refrigerant cools and undergoes a phase change to warm liquid refrigerant and is delivered to the expander/condenser heat exchanger. Inside the expander/condenser heat exchanger, the warm liquid refrigerant undergoes a phase change back to cool gas refrigerant, cooling the warm moist air produced in the closed air loop which condenses to form freshwater.

The invention includes a combination of important features. First, the invention uses two closed loops, one using a fixed volume of air and the other using a fixed volume of refrigerant. During operation, the two closed loops interact to continuously transfer energy back and forth between the air and the refrigerant.

Second, the system creates greater heat differential between the cool dry air and the hot refrigerant gas, making the overall system more efficient.

Third, by evaporating contaminated water and condensing pure water "between" the two heat exchangers that exchange an energy differential between the two closed loops, energy normally lost is recovered and used in the distillation process, reducing total energy required for a given volume of purified water produced.

DESCRIPTION OF THE PREFERRED EMBODIMENT(S)

Referring to the accompanying Figures, there is disclosed a compact, efficient water purification system 1 that uses a closed air loop 2, a closed refrigerant loop 3 interconnected at two heat exchangers 10 and 31.

Figure 1:
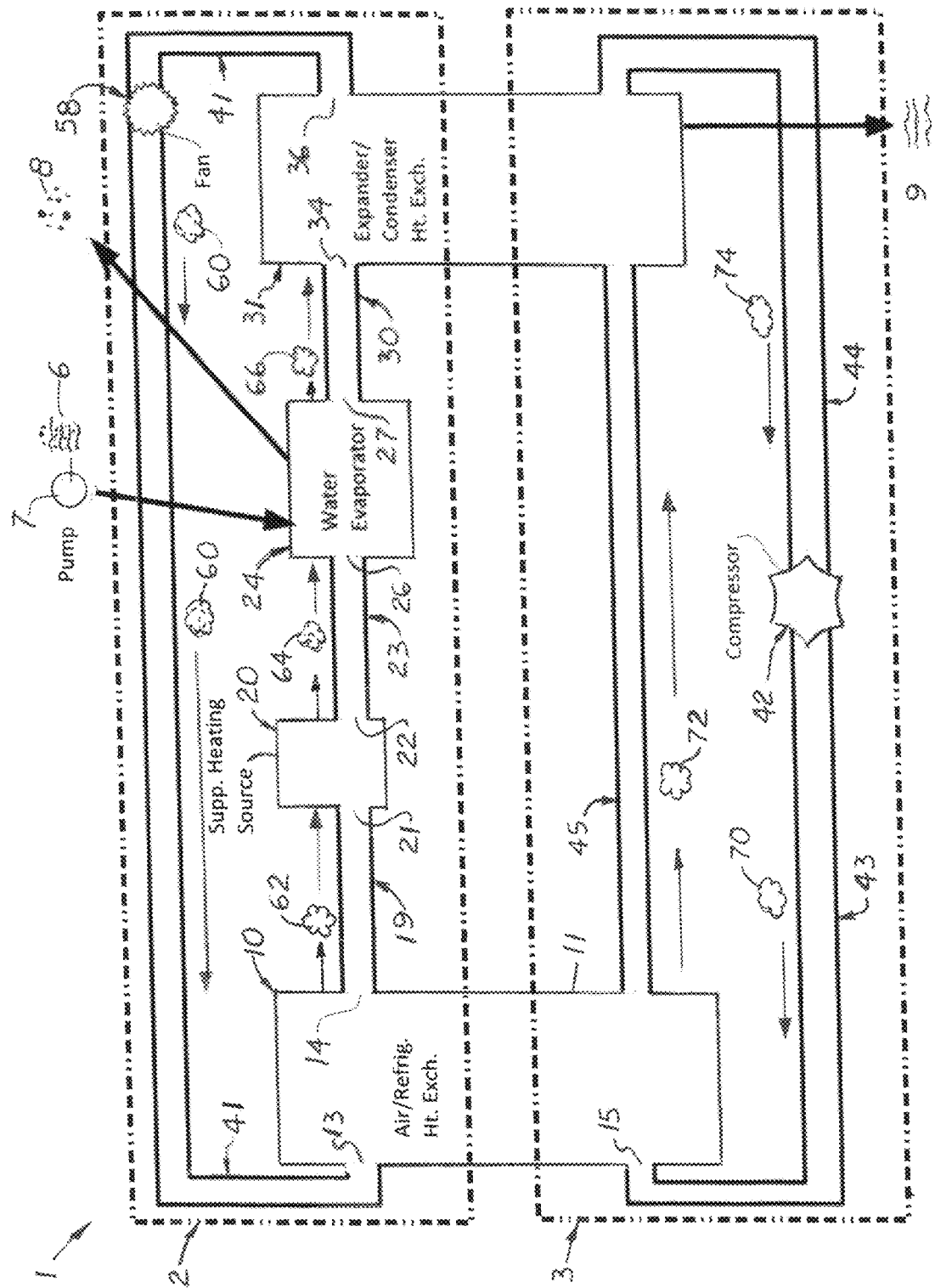
FIG. 1 is a flow chart illustration of the system showing two subsystems or loops.

The closed air loop 2 includes an air/refrigerant heat exchanger 10, a supplemental heating source 20, a water evaporator 24, an expander/condenser heat exchanger 31. Extending between the air outlet port 14 on the air/refrigerant heat exchanger 10 and the inlet port 21 on the supplemental heating source 20 is a first air conduit 19. Extending between the air outlet port 22 on the supplemental heating source 20 and the air inlet port 26 on the water evaporator 24 is a second air conduit 23. Extending between the air outlet port 27 on the water evaporator 20 and the coolant inlet port 34 on the expander/condenser heat exchanger 31 is a third air conduit 30. Extending from the air outlet port 36 on the expander/condenser heat exchanger 31 to the air inlet port 13 on the air/refrigerant heat exchanger 10 is a fourth air conduit 41. Attached to the fourth air conduit 41 is at least one fan 58 that forces airflow in one direction in the closed air loop 2 as shown in FIG. 1.

After assembly, the air/refrigerant heat exchanger 10, the supplemental heating source 20, the water evaporator 24, the expander/condenser heat exchanger 31 and the conduits 19, 23, 30 and 41 are connected to form a closed, continuous loop used to carry a fixed volume of air. As the air flows in the closed air loop 2, it is first heated by a hot gas refrigerant 70 flowing through the air/refrigerant heat exchanger 10 to form warm dry air 62. The hot gas refrigerant 70 undergoes a phase change to a warm liquid refrigerant 72. The warm dry air is then heated by the supplemental heating source 20 to form hot dry air 64. The temperature of the hot dry air 64 is sufficient to evaporate saltwater or contaminated water 6. The hot dry air 64 is then delivered to the water evaporator 24 to create warm moist air 66. The warm moist air 66 delivered to the expander/condenser heat exchanger 31 where the water vapor condenses to form freshwater 9 and cool dry air 60 using heat absorption by a phase change of the warm liquid refrigerant 72 to the cool gas refrigerant 74 used in the closed refrigerant loop 3.

Figure 2:
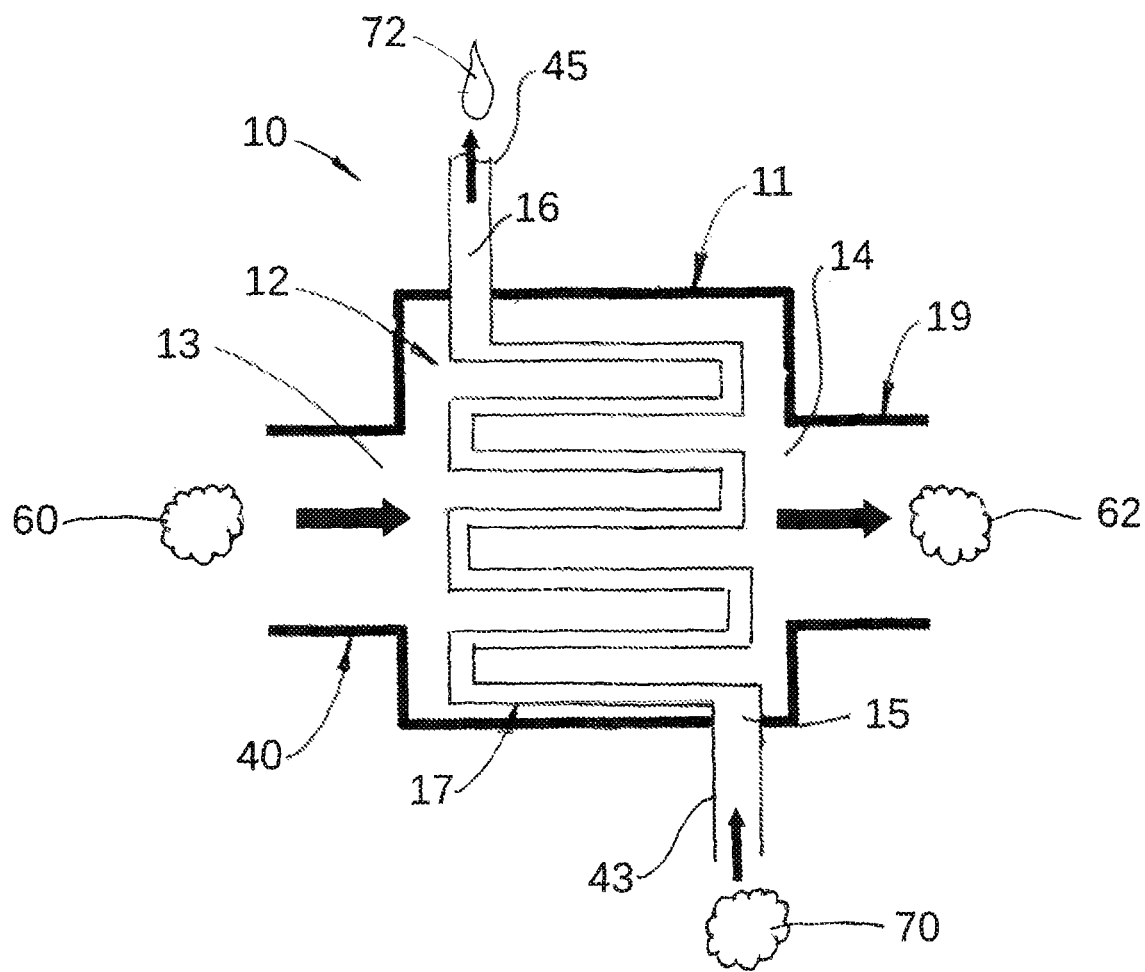
FIG. 2 is an illustration of the air/refrigerant heat exchanger.

The closed refrigerant loop 3 includes a compressor 42, the air/refrigerant heat exchanger 10, and the expander/condenser heat exchanger 31, both also used in the closed air loop 2. The closed refrigerant loop 3 includes a hot gas refrigerant conduit 43 that connects to a refrigerant inlet port 15 formed on the air/refrigerant heat exchanger 10. The air/refrigerant heat exchanger 10, shown more clearly in FIG. 2, includes an outer housing 11 with an interior cavity 12. Also formed on the outer housing 11 is a refrigerant outlet port 16. Located inside the interior cavity 12 and disposed between the refrigerant inlet port 15 and the refrigerant outlet port 16 are coils 17 configured to allow condensation of refrigerant from gas to liquid.

The refrigerant outlet port 16 is connected to a liquid refrigerant conduit 45. The liquid refrigerant conduit 45 is configured to transport the warm liquid refrigerant 72 to the expander/condenser heat exchanger 31 via the refrigerant inlet port 37 on the expander/condenser heat exchanger 31.

During operation, the warm dry air 62 exits the air/refrigerant heat exchanger 10 and is delivered to the supplemental heating source 20. The purpose of the supplemental heating source 20 is to increase the temperature of the warm dry air 62 to maximize evaporation and its moisture content. The supplemental heating source 20 heats the warm dry air 62 and produces hot dry air 64. The hot dry air 64 then flows through the second air conduit 23 and enters the water evaporator 24.

Figure 3:
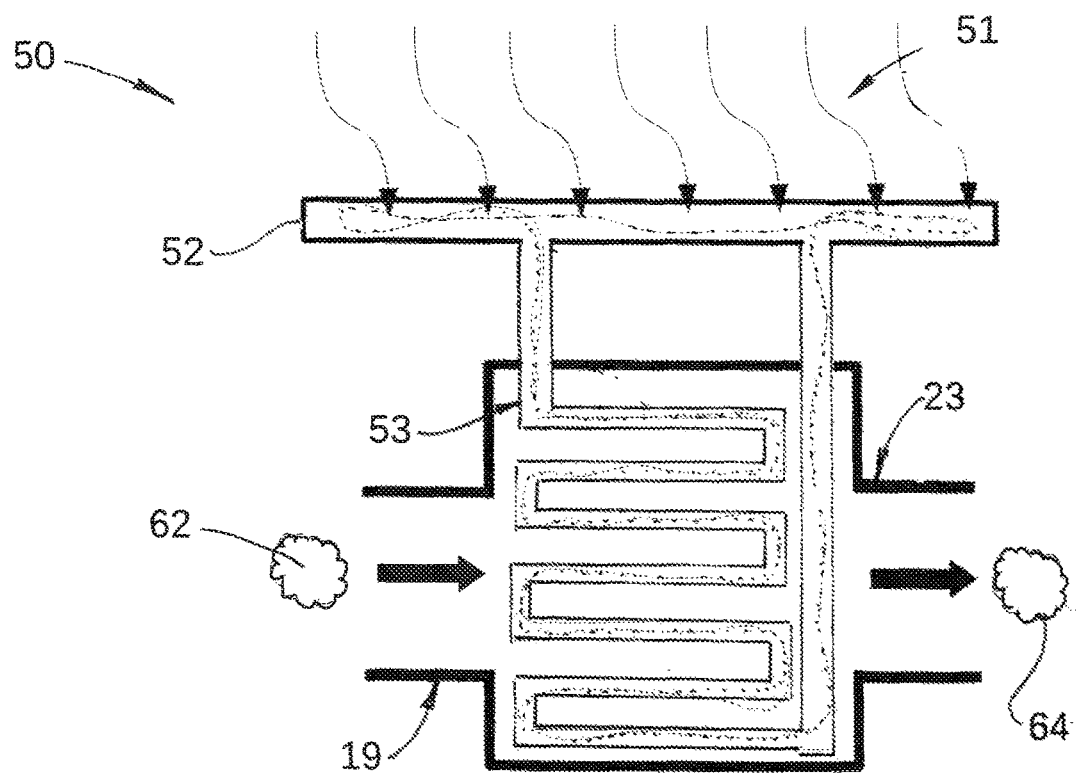
FIG. 3 is an illustration of a solar/water heat exchanger used as a supplemental heating source.
Figure 4:
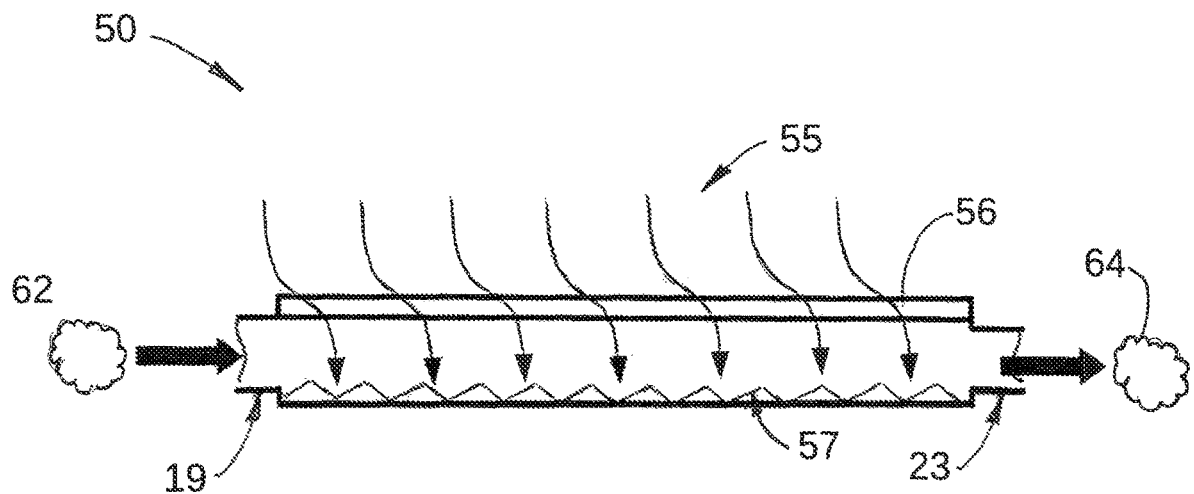
FIG. 4 is an illustration of a solar/air heat exchanger used as a supplemental heating source.

It should be understood, that different types of supplemental heating sources 20 may be used. For example, FIG. 3 shows a solar water heater 51 coupled to the second air conduit 23. The solar water heater 51 includes a solar collector 52 and a heat exchanger 53 that transfers heat from a heat medium located inside the heat exchanger 53 to the warm dry air 62 producing hot dry air 64. FIG. 4 shows a solar/air heat exchanger 55 used as a supplemental heating source 20 that includes a solar collector 56 that collects sunlight and directly heats the warm dry air 62 flowing through the heat exchanger 57 to produce hot dry air 64. Other types of supplemental heating sources include electrical or gas water heaters.

Figure 5:
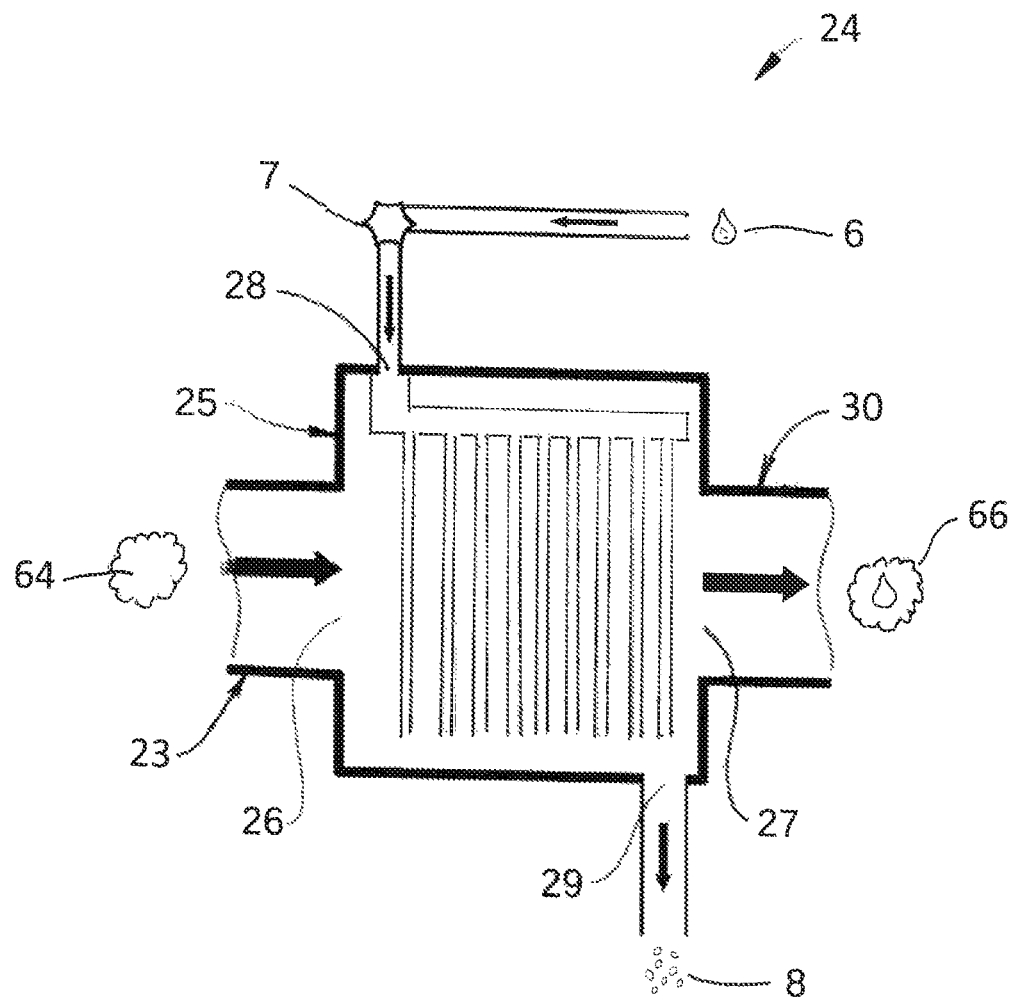
FIG. 5 is an illustration of the water evaporator.

The water evaporator 24, shown more clearly in FIG. 5, includes an outer housing 25 with an air inlet port 26, an air outlet port 27, a water inlet port 28, and an impurity drain port 29. A pump 7 may be used to deliver the saltwater/contaminated water 6 to the water evaporator 24. Inside the water evaporator 24, saltwater/contaminated water 6 undergoes evaporation to form warm moist air 66. The warm moist air 66 then flows through air outlet port 27 into the third air conduit 30 and into the interior cavity 33 formed inside the housing 32 of the expander/condenser heat exchanger 31.

Figure 6:
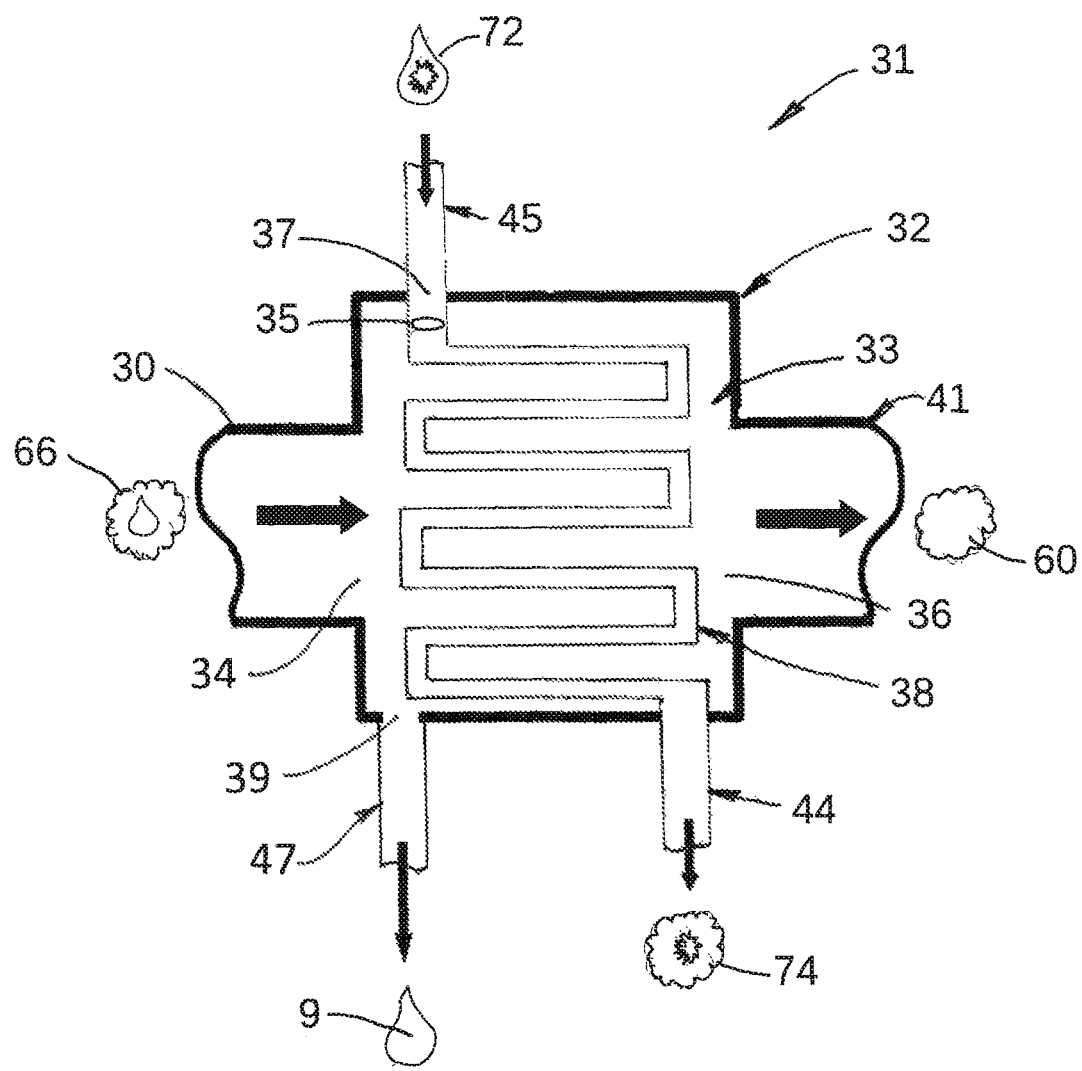
FIG. 6 is an illustration of the expander/condenser heat exchanger.

As shown more clearly in FIG. 6, the expander/condenser heat exchanger 31 includes an outer housing 32 with an inner cavity 33. Inside the inner cavity 33 are coils 38 that extend between an expansion valve 35 and the refrigerant outlet port 39. The coils 38 are configured to absorb heat from the warm moist air 66 deposited into the inner cavity 33 via the water vapor inlet port 34.

The expander/condenser heat exchanger 31, in part, acts as a refrigerant evaporator wherein warm liquid refrigerant 72 expands by passing through an expansion valve 35 and absorbs heat from the coils 38. The coils 38 absorb heat from the warm moist air 66, causing the warm moist air 66 to condense. Freshwater 9 flows out of a drain port 39 in the expander condenser 31 and into a drain conduit 47. After giving up its water vapor, the cool dry air 60 formed inside the expander/condenser heat exchanger 31 flows through the outlet port 36 and into the fourth air conduit 41 that leads to air/refrigerant heat exchanger 10.

The flow of air in the closed air loop 2 is created by a fan 58 coupled to one of the air conduits 41, 62, 64, or 66. FIG. 1 shows the fan 58 attached to the 4*air conduit 41. It should be understood that the fan 58 may be placed at other locations in the closed air loop 2. The fan 58 causes the cool dry air 60 to flow continuously in the closed air loop 2.

The flow of refrigerant in the closed refrigerant loop 3 is controlled by the compressor 42 located between the air/refrigerant heat exchanger 10 and the expander/condenser Heat exchanger 31.

System 1 is compact and designed to be used in a small space such as a boat, a motorhome, or a cabin where external electrical sources are limited. In such environments, a battery or a solar electrical power system may be included in the system 1 that provides electricity to the pump 7, to the compressor 42, or to the fan 58. It should be understood, however, system 1 may be used in other environments and where the external electrical source is unlimited. During operation, system 1 uses the back-and-forth exchange of heat between the cool dry air 60 and the hot gas refrigerant 70 in the two closed subsystems 2 and 3, respectively, via two heat exchangers 10, 31.

The invention is based on the principle that the amount of water vapor in a volume of air can hold is a function of its temperature. The invention is also based on the principle that maximizing the heat differential between cool dry air 60 and hot gas refrigerant 70 improves efficiencies and reduces the amount of externally sourced energy required for refrigerant liquification. The invention is also based on the principal that phase change back and forth between liquid phase and gas phase can be accomplished at moderate temperatures and that the energy needed to cause these phase changes may be conserved through the exchange of temperature differentials between working fluids.

Unless otherwise specified, relational terms such as 'hot', 'warm', and 'cool', used in the present disclosure, should be construed to include certain tolerances that those skilled in the refrigeration arts would recognize as providing equivalent functionality. By way of example, the term 'cool dry air' refers to air that has been sufficiently reduced in temperature below its dew point such that at least 50% of its moisture has condensed. The term 'warm dry air' refers to air that is warmer than cool dry air and above the saturation temperature of cool dry air. The term 'hot dry air' refers to air that is warmer than 'warm dry air' and at a temperature above the saturation temperature of warm dry air. The term 'warm moist air' refers to air that is cooler than 'hot dry air' and at least 50% saturated.

In compliance with the statute, the invention described has been described in language more or less specific as to structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted in accordance with the doctrine of equivalents.

I claim:

1. An efficient water purification system, comprising:
   a. a closed, air loop subsystem including an air/refrigerant heat exchanger, a supplemental heating source, a water evaporator, and an expander/condenser heat exchanger, said air/refrigerant heat exchanger, said supplemental heating source, said water evaporator, and said expander/condenser heat exchanger being coupled together with conduits enabling a fixed volume of air to flow continuously in one direction and in a closed loop from said air/refrigerant heat exchanger to said supplemental heating source to said water evaporator to said expander/condenser heat exchanger and back to said air/refrigerant heat exchanger, said air/refrigerant heat exchanger configured to remove heat from hot gas refrigerant delivered thereto thereby forming warm liquid refrigerant and warm dry air, said supplemental heating source configured to receive and heat said warm dry air from said air/refrigerant heat exchanger and form hot dry air sufficient to evaporate saltwater or contaminated water, said water evaporator configured to receive said hot dry air from said supplemental heating source and receive a volume of saltwater or contaminated water thereby causing said volume of saltwater or contaminated water to evaporate and form warm moist air and impurities, said expander/condenser heat exchanger configured to receive said warm moist air from said water evaporator and condense said warm moist air into freshwater and cool dry air and then return said cool dry air to said air/refrigerant heat exchanger; and
   b. a closed, refrigerant loop subsystem including a compressor, said air/refrigerant heat exchanger, and said expander/condenser heat exchanger, said compressor, said air/refrigerant heat exchanger, and said expander/condenser heat exchanger being coupled together with conduits enabling refrigerant to flow continuously between said air/refrigerant heat exchanger, and said expander/condenser heat exchanger components, said compressor configured to pressurize said refrigerant forming pressurized hot gas refrigerant, said air/refrigerant heat exchanger configured to receive said hot gas refrigerant from said compressor and heat said cool dry air delivered by said closed air loop subsystem, said air/refrigerant heat exchanger also configured so that said hot gas refrigerant delivered to said air/refrigerant heat exchanger undergoes a phase change to a liquid refrigerant, said expander/condenser heat exchanger configured to receive said liquid refrigerant from said air/refrigerant heat exchanger wherein said liquid refrigerant undergoes a phase change to gas refrigerant, said compressor configured to form a vacuum inside said expander/condenser heat exchanger that causes said liquid refrigerant to undergo a phase change to said gas refrigerant and thereby absorb heat from said warm moist air delivered to said expander/condenser heat exchanger via said closed air loop, said compressor also configured to receive said gas refrigerant formed in said expander/condenser heat exchanger and compress said gas refrigerant into said hot gas refrigerant.

2. The water purification system as recited in claim 1, wherein said supplemental heating source is a solar water heater.

3. The water purification system as recited in claim 1, wherein said supplemental heating source is a solar/air heat exchanger.

4. The water purification system as recited in claim 1, wherein said supplemental heating source is an electric or gas water heater.

5. The water purification system as recited in claim 1, further includes a fan coupled to said closed air loop subsystem causing said air to flow in said closed air loop from said expander/condenser heat exchanger to said air/refrigerant heat exchanger, to said supplemental heating source, to said water evaporator, and back to said expander/condenser heat exchanger.

6. The water purification system as recited in claim 1, further includes a pump configured to deliver said volume of saltwater or contaminated water to said water evaporator.

7. The water purification system, as recited in claim 5, further includes a pump used to deliver said volume of saltwater or contaminated water into said water evaporator.

8. The water purification system as recited in claim 7, further including means for removing said impurities from said water evaporator.

9. An efficient water purification system, comprising:
   a. a closed air loop subsystem that carries a fixed volume of air that is repeatedly heated and cooled;
   b. a fan coupled to said closed air loop subsystem and causes said air to flow continuously in said closed air loop subsystem;
   c. a closed refrigerant loop subsystem that carries a fixed volume of a refrigerant configured to undergo phase change from a gas to a liquid and from a liquid to a gas;
   d. an air/refrigerant heat exchanger connected to said closed air loop subsystem and to said closed refrigerant loop system, said air/refrigerant heat exchanger configured to receive cool dry air flowing in said closed air loop subsystem and configured to receive said refrigerant in a gas phase flowing in said closed refrigerant loop system, in said air/refrigerant heat exchanger said refrigerant undergoes a phase change from a gas to liquid refrigerant and transfers heat to said cool dry air flowing in said closed air loop subsystem to produce warm dry air;
   e. a supplemental heating source connected to said closed air loop subsystem system, said supplemental heating source being located downstream from said air/refrigerant heat exchanger, said supplemental heating source configured to heat said warm dry air from said air/refrigerant heat exchanger to form hot dry air sufficiently hot to evaporate saltwater or contaminated water;
   f. a water evaporator configured to receive said hot dry air from said supplemental heating source and receive saltwater or contaminated water, said water evaporator configured so that said saltwater or said contaminated water undergoes evaporation when mixed with said hot dry air from said supplemental heating source to form warm moist air;

g. an expander/condenser heat exchanger connected to said closed air loop subsystem and said closed refrigerant loop subsystem, said expander/condenser heat exchanger configured to receive said refrigerant in a liquid phase from said air/refrigerant heat exchanger and configured to receive said warm moist air from said water evaporator, said refrigerant in a liquid phase undergoes a phase change to gas refrigeration and absorbs heat causing said warm moist air to condense to form freshwater and cool dry air; and h. a compressor coupled to said closed refrigerant loop subsystem and downstream from said expander/condenser heat exchanger, said compressor configured to reduce pressure in said expander/condenser heat exchanger thereby causing said refrigerant to undergo phase change from a liquid to a gas in said expander/condenser heat exchanger, said compressor also configured to pressurize said gas flowing from said expander/condenser heat exchanger producing compressed hot gas refrigerant delivered to said air/refrigerant heat exchanger.

10. The water purification system as recited in claim 9, wherein said supplemental heating source is a solar water heater.

11. The water purification system as recited in claim 9, wherein said supplemental heating source is a solar/air heat exchanger.

12. The water purification system as recited in claim 9, wherein said supplemental heating source is an electric or a gas water heater.

13. The water purification system as recited in claim 9, further includes a fan coupled to said closed air loop subsystem causing said air to flow in said closed air loop from said expander/condenser heat exchanger, to said air/refrigerant heat exchanger, to said supplemental heating source, to said water evaporator, and back to said expander/condenser heat exchanger.

14. The water purification system as recited in claim 13, further includes a pump configured to pump said saltwater or said contaminated water into said water evaporator.

15. The water purification system as recited in claim 14, further includes a battery or solar electrical power system used to provide electricity used by said pump or said compressor or said fan.

16. A method for producing freshwater from salt or contaminated water using a water purification system comprising the following steps:
   a. selecting a water purification system including
      i. a closed, air loop subsystem including an air/refrigerant heat exchanger, a supplemental heating source, a water evaporator, and an expander/condenser heat exchanger, said air/refrigerant heat exchanger, said supplemental heating source, said water evaporator, and said expander/condenser heat exchanger being coupled together with conduits enabling a fixed volume of air to flow continuously in one direction and in a closed loop from said air/refrigerant heat exchanger to said supplemental heating source to said water evaporator to said expander/condenser heat exchanger and back to said air/refrigerant heat exchanger, said air/refrigerant heat exchanger configured to remove heat from hot gas refrigerant delivered thereto thereby forming warm liquid refrigerant and warm dry air, said supplemental heating source configured to receive and heat said warm dry air from said air/refrigerant heat exchanger and form hot dry air sufficient to evaporate saltwater or contaminated water, said water evaporator configured to receive said hot dry air from said supplemental heating source and receive a volume of saltwater or contaminated water thereby causing said volume of saltwater or contaminated water to evaporate and form warm moist air and impurities, said expander/condenser heat exchanger configured to receive said warm moist air from said water evaporator and condense said warm moist air into freshwater and cool dry air and then return said cool dry air to said air/refrigerant heat exchanger; and
      ii. a closed, refrigerant loop subsystem including a compressor, said air/refrigerant heat exchanger, and said expander/condenser heat exchanger, said compressor, said air/refrigerant heat exchanger, and said expander/condenser heat exchanger being coupled together with conduits enabling refrigerant to flow continuously between said air/refrigerant heat exchanger, and said expander/condenser heat exchanger components, said compressor configured to pressurize said refrigerant forming pressurized hot gas refrigerant, said air/refrigerant heat exchanger configured to receive said hot gas refrigerant from said compressor and heat said cool dry air delivered by said closed air loop subsystem, said air/refrigerant heat exchanger also configured so that said hot gas refrigerant delivered to said air/refrigerant heat exchanger undergoes a phase change to a liquid refrigerant, said expander/condenser heat exchanger configured to receive said liquid refrigerant from said air/refrigerant heat exchanger wherein said liquid refrigerant undergoes a phase change to said gas refrigerant, said compressor configured to form a vacuum inside said expander/condenser heat exchanger that causes said liquid refrigerant to undergo a phase change to said gas refrigerant and thereby absorb heat from said warm air delivered to said expander/condenser heat exchanger via said closed air loop, said compressor also configured to receive said gas refrigerant formed in said expander/condenser heat exchanger and compress said gas refrigerant into said hot gas refrigerant;
   a. phase back into a gas;
   b. activating said compressor; and
   c. delivering saltwater or contaminated water to said water evaporator.

* * * * *